United States Patent [19]
Wheatley

[11] Patent Number: 5,997,666
[45] Date of Patent: Dec. 7, 1999

[54] GN, AGN AND KP GAS GENERATOR COMPOSITION

[75] Inventor: Brian K. Wheatley, Marshall, Va.

[73] Assignee: Atlantic Research Corporation, Vienna, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,454

[22] Filed: Sep. 30, 1996

[51] Int. Cl.⁶ ........................................ C06B 45/10
[52] U.S. Cl. ...................... 149/19.91; 149/36; 149/62; 149/78
[58] Field of Search ........................ 149/78, 62, 36, 149/19.91

[56] References Cited

U.S. PATENT DOCUMENTS

| | | |
|---|---|---|
| 3,031,347 | 4/1962 | Philipson . |
| 3,739,574 | 6/1973 | Godfrey . |
| 3,845,970 | 11/1974 | Herrmann . |
| 3,909,324 | 9/1975 | Niles . |
| 3,954,528 | 5/1976 | Chang et al. . |
| 4,111,728 | 9/1978 | Ramnarace . |
| 4,421,578 | 12/1983 | Voreck ........................................ 149/62 |
| 4,543,136 | 9/1985 | Edamura et al. . |
| 4,948,439 | 8/1990 | Poole et al. . |
| 5,035,757 | 7/1991 | Poole . |
| 5,125,684 | 6/1992 | Cartwright . |
| 5,197,758 | 3/1993 | Lund et al. . |
| 5,336,439 | 8/1994 | Forsberg et al. . |
| 5,411,615 | 5/1995 | Sumrail et al. . |
| 5,431,103 | 7/1995 | Hack et al. . |
| 5,472,535 | 12/1995 | Menderhalt et al. ...................... 149/36 |
| 5,482,579 | 1/1996 | Ochi et al. . |
| 5,507,891 | 4/1996 | Zeigler . |
| 5,518,054 | 5/1996 | Mitson et al. ............................ 149/35 |
| 5,531,941 | 7/1996 | Poole ...................................... 264/3.4 |
| 5,538,567 | 7/1996 | Henry et al. .............................. 149/18 |
| 5,545,272 | 8/1996 | Poole et al. . |
| 5,551,725 | 9/1996 | Ludwig . |
| 5,747,730 | 5/1998 | Scheffee et al. .......................... 149/47 |
| 5,850,053 | 12/1998 | Scheffee et al. ..................... 149/19.91 |

OTHER PUBLICATIONS

Mayer, *Handbook of Explosives*, pp. 130, 297, Verlog Chemie (1977) New York JP 270, A2 M4913.

*Primary Examiner*—Edward A. Miller
*Attorney, Agent, or Firm*—Nixon & Vanderhye

[57] ABSTRACT

The combination of guanidine nitrate (GN), aminoguanidine nitrate (AGN) and potassium perchlorate (KP) in defined proportions serves as an effective gas generative composition that displays enhanced burning rate performance at 2000 and 4000 psi. Through the addition thereto of small amounts of potassium nitrate (KN) the burning rate and pressure component of the composition is further improved and through the addition of polyvinyl alcohol (PVA) both greater dimensional strength and superior stability are provided.

11 Claims, 2 Drawing Sheets

Passenger Side Inflator

GN, AGN AND KP GAS GENERATOR COMPOSITION

FIELD OF THE INVENTION

This invention involves compositions for producing a low particulate, non-flammable, odorless, non-toxic and colorless gas for inflating inflatable passenger restraint devices. The composition consists essentially of guanidine nitrate (GN), aminoguanidine nitrate (AGN), potassium perchlorate (KP), and preferably includes potassium nitrate (KN) alone, or with polyvinyl alcohol (PVA). The composition finds particular use in providing gas to inflate an air bag in an occupant restraint in an automobile.

PRIOR ART

A growing number of vehicles are being provided with air bags to insure the safety of the occupants therein. However, while new compositions may be formulated to generate suitable gases in a high volume, there are important factors that must be considered in determining whether any particular composition is acceptable for commercial use. Although it is self-evident that the gas produced by a potential crash bag composition must be generated in high volume, be non-toxic and be non-flammable, there are other properties that cannot be dismissed. Thus, the temperature of the gas generated must be sufficiently low that it is readily tolerated by the occupants of any vehicle in which it is employed. Moreover, since smoke or gas with a smoke-like appearance causes the occupants of the vehicle to suspect the possibility of a conflagration, components that produce visible particulates, must be avoided, because of psychological reasons, as well as physiological aspects.

Furthermore, it is vital for the gas-generative compositions to be stable over long periods of time and under the different temperature conditions that it may encounter after it is installed in a vehicle. In addition to the foregoing, there are ecological and environmental hazards that may be created by failing to consider the possible consequences of permitting the gas-generative compositions to remain in vehicles that are no longer operable and must be scrapped. The failure to meet the standards imposed by industry, the public, government and common sense eliminate many compositions from being tested for vehicle restraint devices. On the other hand, it is difficult, if not impossible, to predetermine which compositions will function in a satisfactory manner, without the noted drawbacks, to accomplish the desired objectives set forth above in the absence of actual comprehensive testing of a particular formulation.

Although many patents disclose lists of oxidizers that include the alkali and alkaline earth perchlorates and lists of materials that may be employed to serve as a fuel to be oxidized and thereby generate a gas, in general, the literature, including the patented literature, does not focus on any specific combination of reactants that will be effective, economical and safe.

With respect to patent disclosures, U.S. Pat. No. 4,948,439 refers to a mixture of ammonium perchlorate and sodium nitrate in a 1 to 1 mole ratio as an especially useful oxidizer "compound". Among other useful oxidizing compounds described, are various salts, such as the ammonium, alkali metal, and alkaline earth metal nitrates and perchlorates. The patentee cautions that ammonium perchlorate, although a good oxidizer, is not useful as the sole oxidizer because it will produce hydrogen chloride or other toxic properties, if not balanced by the presence of a metal, such as sodium or potassium. This appears to limit the use of chlorine-containing oxidizers to the sodium and potassium salts unless particular sodium or potassium compounds are included in the composition.

The patentee in U.S. Pat. No. 5,482,579 refers to a prior art composition comprising an oxidizer agent, a binder, cellulose acetate, and a carbon-containing combustion controller. The composition is said to contain 78% to 92% by weight of a chlorate or perchlorate of an alkali metal or alkaline earth metal as the oxidizing agent, 7.9% to 17.2% by weight of a cellulose acetate and 0.1% to 0.8% by weight of a carbon-containing combustion controller.

In the above-identified patent, at col. 4, beginning at line 20, the patentee identifies a nitrogen-containing non-metallic compound to control the combustion temperature as one selected from the group consisting of guanidine compounds, oximes, amides, tetrazole derivatives, aromatic nitro compounds and ammonium nitrate. Guanidine nitrate is specifically mentioned. In the tables, the weight percent of potassium perchlorate varies from approximately 45% to about 82%. The utility for said composition, as well as that of the former patent, is for generating a gas to inflate a crash bag.

Gas is also produced for purposes alien to passenger restraint devices. U.S. Pat. No. 3,909,324 describes the provision of a novel pyrotechnic composition for disseminating smoke dyes, pesticides, agents for chemical warfare and the like. The compositions include aminoguanidium nitrate or a condensation product thereof, as a fuel, and inorganic oxidizers which are readily combustible at atmospheric pressure. In claim 1 of the patent, a pyrotechnic disseminating formulation is described wherein about 8% to about 48% by weight aminoguanidine nitrates or condensation products thereof are combined with 8% to about 38% by weight of an alkali metal or ammonium chlorate or perchlorate as oxidizer, with the balance being an effective amount of a chemical warfare agent, an incapacitating agent, a smoke dye or a plant growth regulant to be disseminated.

The subject of U.S. Pat. No. 4,543,136 concerns a water-in-oil emulsion explosive composition. The composition includes an inorganic oxidizer salt which may be one of various nitrates, chlorates or perchlorates, including alkali metal or alkaline earth metal perchlorates. The inorganic oxidizer salts are used alone or in the admixture of at least two members. The oxidizer salt is generally present in 5% to 90%, preferably 40% to 85% and is used in the form of an aqueous solution. At col. 5, beginning at line 17, the patentee discusses sensitizers effective for improving the detonation liability and low temperature detonability of the resulting water-in-oil explosive. Among the various substances is guanidine nitrate. The compounding amount of the sensitizer is said to be 0% to 40%, preferably 0.5% to 30%.

Recently issued U.S. Pat. No. 5,538,567, at col. 2, discloses a gas generative propellant mix consisting of from about 55% to about 75% by weight guanidine nitrate; from about 25% to about 45% by weight of an oxidizer selected from potassium and ammonium perchlorates; from about 0.5% to about 5.0% by weight of a flow enhancer, and up to about 5% by weight of a binder. As suitable flow enhancers, graphite and carbon black are mentioned. The only binder taught is calcium resinate.

Aside from the specific composition, the particle size of each component is indicated by the patentee to be important. Thus, the average recommended particle size of GN is said to be between 75 and 350 microns; of the oxidizer, about 50 to about 200 microns; and of the flow-enhancer, about 7 to about 70 microns. None of the known prior art discloses or suggests the present invention.

BACKGROUND OF THE INVENTION

It is an object of the present invention to provide a composition for generating a particulate-free, non-toxic, non-flammable, odorless and colorless gas for use in various environments, primarily for the inflation of an air bag in an automotive vehicle. However, the composition of this invention may also be employed to inflate such items as an inflatable raft or a passenger escape chute of an airplane.

The unique advantage of employing the formulations of the instant invention resides in the cycling and/or the ballistics of the composition. Whereas prior art composition grains consisting essentially of a fuel, e.g., GN, and an oxidizer, e.g., KP, do not maintain their size during 200 cycles at −40 to ±107° C. and 17 days at 107° C., the instant formulations, containing AGN, KN and PVA with GN and KP exhibit no significant change in diameter or in strength during said tests. Likewise, in contrast to compositions described in the prior art, the inventive formulations consisting essentially of GN, KP and AGN, exhibit materially higher burning rates, in ips (inches per second), at 2000 and at 4000 psi.

To utilize the generated gas requires the provision of an enclosed pressure chamber having at least one exit port and a composition in the form of a powder charge or pressed into propellant grains of a suitable shape, located within said compression chamber. The described composition comprises a propellent containing a guanidine nitrate and an aminoguanidine nitrate mixed with potassium perchlorate, and optionally potassium nitrate, as oxidizers and, optionally, a polyvinyl alcohol binder. The formulation is prepared by forming a solid solution comprised of GN, AGN, KN and PVA, which in turn is blended with KP powder; said composition is used in the disclosed pressure chamber having at least one exit port. Thus, upon ignition, the formulation, in response to a sudden deceleration being detected by a sensor device in the pressure chamber substantially instantly generates a gas and conducts it through the exit ports of said pressure chamber to accomplish a desired function, such as inflating an automotive vehicle air bag.

SUMMARY OF THE INVENTION

The gas-generating composition of the instant invention contains a propellant comprising about 35% to 50% by weight guanidine nitrate, about 10% to about 30% by weight aminoguanidine nitrate, about 30% to 40% by weight potassium perchlorate, 0% to about 6% by weight potassium nitrate and 0% to about 5% by weight polyvinyl alcohol.

The invention also includes the method of generating a gas by employing the propellant of the present invention optionally with suitable other gas generators for the production of non-toxic, non-flammable, odor-free gas. The method is carried out in a conventional air bag inflator.

DETAILED DESCRIPTION OF THE INVENTION

Figure 1:
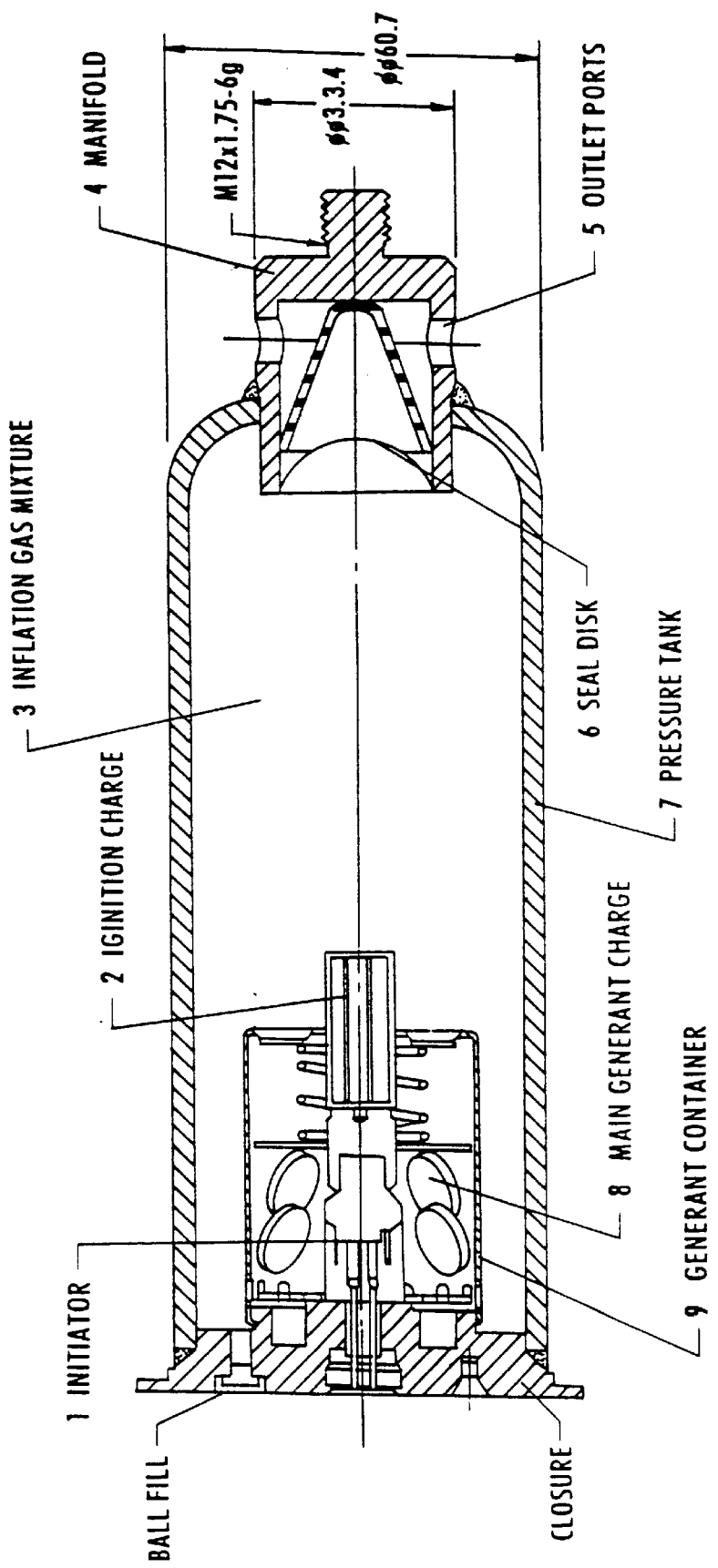
FIG. 1 is a conventional passenger-side inflator that may be used in practicing the method of the instant invention.

FIG. 1 depicts a conventional passenger-side inflator for an automobile. In practice, the initiator (1) ignites in response to a sensor (not shown) that senses rapid deceleration indicative of a collision. The initiator gives off hot gases that ignite the ignition charge (2) which causes the main generant charge (8) to combust, generating the inflation gas mixture (3). When the pressure in said gas mixture increases to a certain point, the seal disk (6) ruptures, permitting the gas mixture to exit the manifold (4) through the outlet ports (5) and inflate an air bag. The generant container (9) holds the main generant charge (8). All the charges in the inflation gas mixture are enclosed in the pressure tank (7).

Figure 2:
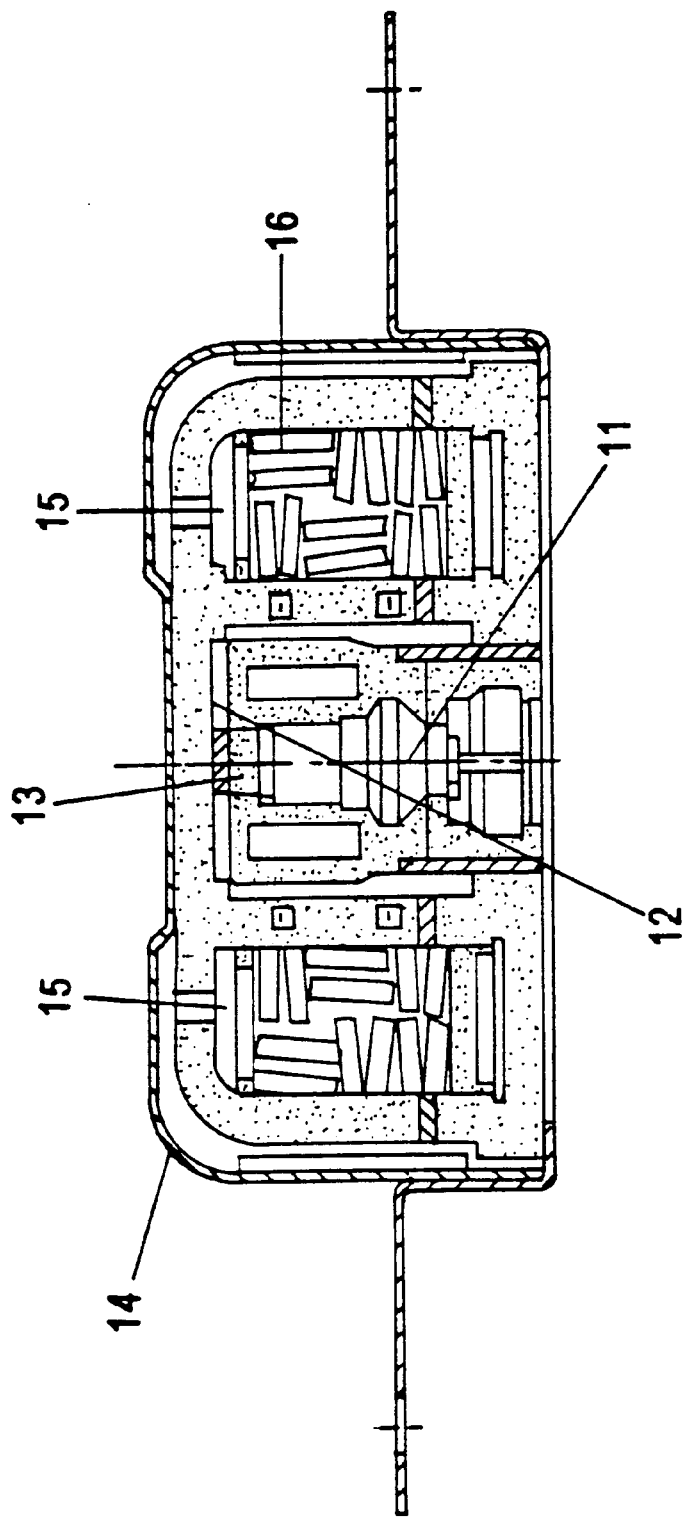
FIG. 2 is a conventional driver-side inflator that may be used in practicing the method of the present invention.

FIG. 2 is a drawing of a pyrotechnic generator in which the instant invention may be employed. Since no part of the inflator is reserved for storage capacity, the device is smaller than its counterpart hybrid inflator. In this figure, there is an initiator (11) that will combust in response to a signal from a sensor (not shown), that generates said signal as a result of a change in conditions, e.g., an excessive increase in temperature or a sudden deceleration of a vehicle (indicative of a crash), in which the inflator is installed. The initiator (11) gives off hot gases that ignite the main generant charge (16), which combusts, generating an inflation gas mixture. Said mixture exits the manifold (14) through the exit ports (15). To insure that the gas generating propellant (16) will be ignited well below its autoignition temperature ($T_{ig}$) and well below that temperature where the materials of construction of the hardware begin to weaken, an autoignition propellant (AIP) (13) having a suitably low $T_{ig}$ is used to ignite the ignition charge (12), which then ignites the propellant (16).

Additional objects and advantages of the present invention will become readily apparent to those skilled in this art from the following detailed description wherein only the preferred embodiments of the invention are shown and described, simply by way of illustration of the best mode contemplated for carrying out the invention. As will be realized, the invention is capable of other and different embodiments and its several details are capable of modifications of various obvious respects, all without departing from the invention. Accordingly, the drawing and description are to be regarded as illustrative in nature and not as restrictive.

The present invention involves a composition for generating a non-toxic, low particulate, non-flammable, odorless and colorless gas, which may be used to inflate automotive air bags and similar inflatable devices or to provide a carrier gas for chemical fire suppressants in fire extinguishment systems. It is a further object to provide a composition with improved cycling stability and ballistic properties. The instant invention involves compositions with improved thermal cycling stability over the range of −40 to ±107° C. and having 1) an increased burning rate; 2) a decreased pressure exponent; or 3) a decreased ignition delay.

FURTHER EXPLANATION AND EXEMPLIFICATION OF THE TECHNICAL IMPROVEMENT SUPPLIED BY THE INSTANT INVENTION

Pressed pellets for air bag applications sustain thermal and tensile shock during ignitor functioning. For ballistic performance to remain unaffected, pellets must be strong enough to remain intact during gas generator functioning. Pellets must retain this capability even after aging (17 days exposure to 107° C.) and cycling (200 cycles −40 to ±107° C.). Conservative limits for dimensional stability and final pellet strength after cycling/aging have been adopted. These limits are less than 3% dimensional change and pellet strength greater than 4,000 psi at ambient test conditions. The 4,000 psi limit at 25° C. allows a margin of error for functioning units under hot conditions where pellet strengths often begin to decrease. The less than 3% dimension change requirement would allow a typical pellet with a diameter of 0.522 inches to increase up to a diameter of 0.538 inches. To demonstrate the unexpected stability of the pellet exhibited by formulations in accordance with the present invention, data are presented in TABLE I below.

TABLE I

| Ingredient | #301 | #302 | #312 | #313 | #314 | #322C ARCAIR 104 | #299 |
|---|---|---|---|---|---|---|---|
| GN | 56 | 56 | 45 | 45 | 40 | 65 | 60 |
| KP | 34 | 32 | 35 | 33 | 36 | 35 | 38 |
| AGN | 10 | 10 | 20 | 20 | 20 | — | — |
| KN | — | 2 | — | 2 | 2 | — | — |
| PVA | — | — | — | — | 2 | — | 2 |
| Initial Pellet: | | | | | | | |
| Diameter, in; | .522 | .522 | .522 | .522 | .521 | .523 | .523 |
| Strength, psi | 4880 | 4784 | 5510 | 5377 | 7175 | 4027 | 6427 |
| 200 Cycles (−40/+107° C. | | | | | | | |
| Diameter, in; | .530 | .529 | .532 | .526 | .522 | .548 | .526 |
| Strength, psi | 4781 | 3506 | 4593 | 6749 | 9162 | 1925 | 6441 |
| 17 Days @ 107° C. | | | | | | | |
| Diameter, in, | .524 | .524 | .525 | .524 | .522 | .525 | .522 |
| Strength, psi, | 2604 | 2807 | 2760 | 3885 | 8322 | 4237 | 6935 |
| Burning Rate, ips | | | | | | | |
| @ 2000 | | | .96 | .99 | .73 | .84 | .68 |
| @ 4000 | | | 1.33 | 1.51 | 1.05 | 1.13 | 1.04 |

From TABLE I, it will be recognized that composition #314 is outstanding in stability and strength both in cycling and in aging. Composition #313 also exhibits good stability, although somewhat less than #314. The last composition, #312, displays sufficient stability to meet the standards previously described and also exhibits a good burning rate, especially when considered with comparative examples #322C (ARCAIR 104) and #299, both of which lack the presence of AGN.

A one embodiment of the invention is as follows:
a) about 40 to about 45% by weight GN;
b) about 15 to about 20% by weight AGN;
c) about 35 to about 40% by weight KP;
d) about 2 to about 5% by weight KN; and
e) about 1 to about 3% by weight PVA.

The invention may be viewed as concerning compositions based on the following mixtures:
1) a synergistic mixture of AGN/PVA which in combination with GN/KP yields dimensional strength and stability superior to GN/KP/PVA or GN/KP/AGN mixtures alone.
2. a synergistic mixture of KN/AGN which in certain compositions, yields surprisingly high burning rates and low pressure exponents relative to non-KN containing mixes. Low levels of KN (1–5%) are sufficient to provide the effect.

TABLE II

| Variable | AGN/AN | AGN/AN/KN |
|---|---|---|
| KN content, % | none | 1.75 |
| Burning rate, ips @: | | |
| 22° C./4000 psi | 1.0 | 1.79 |

TABLE II-continued

| Variable | AGN/AN | AGN/AN/KN |
|---|---|---|
| 80° C./4000 psi | 1.0 | 1.85 |
| Pressure Exponent: | | |
| 22° C./1–4 K | 1.3 | 0.7 |
| 80° C./1–4 K | 0.8 | 0.6 |

The ultimate formulation for the invention (#314 in TABLE I) combines the two systems into one containing GN/AGN/KP/KN/PVA. As indicated, mix 314 does afford substantial increases in pellet strength over GN/KP/PVA mixtures and does exhibit superior cycling stability, as evidenced by the absence of dimensional change ($\leq 0.001"$) after 200 thermal cycles (−40 to ±107° C.). Burning rate data for a similar formulation without PVA (#313) affords a 33% burning rate increase at 4000 psi relative to ARCAIR 104 (#322).

The formulation is prepared by forming a solid solution comprised of AGN/GN/KN/PVA, which in turn is blended with KP powder. The mixture may be granulated for use as a powder charge, or may be pressed to form a pellet or pressed charge.

Only the preferred embodiment of the invention and but a few examples of its versatility are shown and described in the present disclosure. It is to be understood that the invention is capable of use in various other combinations and environments and is capable of changes or modifications within the scope of the inventive concept and is expressed herein.

I claim:

1. A gas generative composition for inflating inflatable passenger restraint devices consisting essentially of a solid solution of a) about 35 to about 50% by weight guanidine nitrate (GN), b) about 10 to about 30% by weight aminoguanidine nitrate (AGN), c) about 30 to about 40% by weight potassium perchlorate (KP), d) 0 to about 6% by weight potassium nitrate (KN) and e) 0 to about 5% by weight polyvinyl alcohol (PVA).

2. The gas generative composition according to claim 1, consisting essentially of GN, AGN and KP in the ranges recited.

3. The gas generative composition according to claim 1 consisting essentially of GN, AGN, KP and KN in the ranges recited.

4. The gas generative composition according to claim 2 consisting essentially of
a) about 45% by weight GN,
b) about 20% by weight AGN, and
c) about 35% by weight KP.

5. The gas generative composition according to claim 3 consisting essentially of
a) about 45% by weight GN,
b) about 20% by weight AGN,
c) about 33% by weight KP, and
d) about 2% by weight KN.

6. The gas generative composition according to claim 1 consisting essentially of
a) about 40% by weight GN,
b) about 20% by weight AGN,
c) about 36% by weight KP,
d) about 2% by weight KN, and
e) about 2% by weight PVA.

7. The gas generative composition according to claim 1 which is compacted into pressed structurally stable grains of a suitable shape, which grains exhibit high strength during and after a test at 17 days at 107° C. and reveal only a small acceptable change in diameter during 200 thermal cycles (−40/+107° C.).

8. The gas generative composition according to claim 1 having improved ballistic properties comprising an increased burning rate and/or a decreased pressure exponent or ignition delay.

9. The gas generative composition according to claim 1 which is in the form of a dry powder.

10. In a gas generator for inflating an inflatable restraint device for a vehicle occupant, said generator containing a gas-generative composition, the improvement wherein the gas-generative composition consists essentially of a) about 35 to about 50% by weight GN, b) about 10 to about 30% by weight AGN, c) about 30 to about 40% by weight KP, d) 0 to about 6% by weight KN, and e) 0 to about 5% by weight PVA.

11. The gas generative composition according to claim 1, consisting essentially of a) about 40 to about 45% by weight GN;

b) about 15 to about 20% by weight AGN;

c) about 35 to about 40% by weight KP;

d) about 2 to about 5% by weight KN; and e) about 1 to about 3% by weight PVA.

* * * * *